United States Patent
Heesche et al.

(10) Patent No.: US 11,567,461 B2
(45) Date of Patent: Jan. 31, 2023

(54) METHOD AND DEVICE FOR CONTROLLING A TECHNICAL SYSTEM USING A CONTROL MODEL

(71) Applicant: Siemens Aktiengesellschaft, Munich (DE)

(72) Inventors: Kai Heesche, Munich (DE); Daniel Schneegaß, Munich (DE)

(73) Assignee: SIEMENS AKTIENGESELLSCHAFT

( * ) Notice: Subject to any disclaimer, the term of this patent is extended or adjusted under 35 U.S.C. 154(b) by 1009 days.

(21) Appl. No.: 16/328,605

(22) PCT Filed: Jul. 25, 2017

(86) PCT No.: PCT/EP2017/068755
§ 371 (c)(1),
(2) Date: Feb. 26, 2019

(87) PCT Pub. No.: WO2018/041478
PCT Pub. Date: Mar. 8, 2018

(65) Prior Publication Data
US 2021/0278810 A1    Sep. 9, 2021

(30) Foreign Application Priority Data
Aug. 29, 2016  (EP) .................................. 16186109

(51) Int. Cl.
*G05B 13/02*    (2006.01)
*G06K 9/62*     (2022.01)
(Continued)

(52) U.S. Cl.
CPC ....... *G05B 13/0265* (2013.01); *G06K 9/6232* (2013.01); *G06N 3/04* (2013.01); *G06N 3/08* (2013.01)

(58) Field of Classification Search
CPC .. G05B 13/0265; G05B 13/027; G05B 15/02; G05B 19/042; G05B 2219/2642;
(Continued)

(56) References Cited

U.S. PATENT DOCUMENTS

2010/0174859 A1* 7/2010 Principe ................. G11C 15/04
                                                        711/108
2014/0214733 A1* 7/2014 Alonso .................... G06N 3/02
                                                        706/12
(Continued)

FOREIGN PATENT DOCUMENTS

CN    102546624 A    7/2012
CN    104536290 A    4/2015
(Continued)

OTHER PUBLICATIONS

Chinese Office Action for Application No. 201780066599.0, dated Jun. 28, 2021.
(Continued)

*Primary Examiner* — Nimesh Patel
(74) *Attorney, Agent, or Firm* — Schmeiser, Olsen & Watts LLP (57) ABSTRACT

In order to control a technical system using a control model, a transformation function is provided for reducing and/or obfuscating operating data of the technical system so as to obtain transformed operating data. In addition, the control model is generated by a model generator according to a first set of operating data of the technical system. In an access domain separated from the control model, a second set of operating data of the technical system is recorded and transformed by the transformation function into a transformed second set of operating data which is received by a model execution system. The control model is then executed by the model execution system, by supplying the transformed second set of operating data in an access domain
(Continued)

separated from the second set of operating data, control data being derived from the transformed second set of operating data.

16 Claims, 3 Drawing Sheets

(51) Int. Cl.
*G06N 3/04* (2006.01)
*G06N 3/08* (2006.01)

(58) Field of Classification Search
CPC .......... G05B 19/44; G05B 2219/40304; G06K 9/6232; G06K 9/6255; G06K 17/00; G06K 19/073; G06K 19/06028; G06K 19/07354; G06K 19/077; G06K 19/08; G06K 19/0718; G06K 9/00; G06K 2215/0082; G06N 3/04; G06N 3/08; G06N 3/0454; G06N 20/00; G06N 20/10; G06N 3/02; G06N 7/005; H04H 60/27; H04H 60/46; H04H 20/14; H04H 20/40; H04H 60/15; H04H 60/45; H04H 60/59; H04H 60/64; G06F 21/10; G06F 21/32; G06F 21/31; G06F 21/6209; G06F 2211/007; G06F 21/33; G06F 2221/0797; G06F 2221/008; G06F 2221/2117; G06F 21/71; G06F 21/602; G06F 21/6245; G06F 21/64; G06F 21/606; G06F 21/72; G06F 21/78; G06F 21/14; G06F 21/446; G06F 2221/2103; G06F 2221/2129; G06F 21/62; G06F 21/00; G16H 10/60; G16H 40/67; G16H 50/70; G16H 15/00; G16H 50/20; G16H 50/30; G16H 30/40; G16H 40/20; G16H 10/40; G16H 10/65; G16H 40/40; G16H 40/60; G16H 70/20; G16H 80/00; H04W 12/08; H04W 12/02; H04W 4/021; H04W 12/03; H04W 12/065; H04L 63/0428; H04L 63/0861; H04L 2209/56; H04L 63/08; H04L 67/306; H04L 2463/101; H04L 2463/102; H04L 63/0407; H04L 63/107; H04L 9/3271; H04L 63/105; H04L 9/40; H04L 63/0869; H04L 63/10; G06T 1/00; G06T 2207/30004; G06T 7/0012; A61B 5/0205; A61B 5/0261; A61B 5/441; A61B 5/0002; A61B 5/14532; A61B 5/4836; A61B 5/4839

See application file for complete search history.

(56) References Cited

U.S. PATENT DOCUMENTS

2017/0228432 A1* 8/2017 Aggarwal ............. G06F 16/252
2017/0317983 A1* 11/2017 Kompalli ............... G06V 30/40

FOREIGN PATENT DOCUMENTS

JP     2001144746 A     5/2001
WO   2016118206 A2     7/2016

OTHER PUBLICATIONS

Zhang Qingchen et al: "Privacy Preserving Deep Computation Model on Cloud for Big Data Feature Learning", IEEE Transactions on Computers, IEEE Service Center, Los Alamitos, CA, US, vol. 65, No. 5, pp. 1351-1362, XP011605168, ISSN: 0018-9340, DOI: 10.1109/TC.2015.2470255, gefunden am May 4, 2016; 2016.

PCT International Search Report and Written Opinion of International Searching Authority dated Sep. 6, 2017 corresponding to PCT International Application No. PCT/EP2017/068755 filed Jul. 25, 2017.

* cited by examiner

METHOD AND DEVICE FOR CONTROLLING A TECHNICAL SYSTEM USING A CONTROL MODEL

CROSS-REFERENCE TO RELATED APPLICATIONS

This application claims priority to PCT Application No. PCT/EP2017/068755, having a filing date of Jul. 25, 2017, which is based on European Application No. 16186109.1, having a filing date of Aug. 29, 2016, the entire contents both of which are hereby incorporated by reference.

FIELD OF TECHNOLOGY

The following relates to a method and device for controlling a technical system using a control model.

BACKGROUND

As a rule, the optimization of a behavior, an effect and/or a yield of a technical system in respect of predetermined criteria, in particular, is desirable when controlling complex technical systems, such as, e.g., gas turbines, wind turbines, manufacturing lines, motor vehicles or medical or technical imaging or analysis systems. To this end, contemporary controllers often use complex control models which derive specific control data for the purposes of controlling the technical system from operating data of said technical system. Such control models can be used, in particular, for simulating, predicting, analyzing and/or classifying operating data of the technical system. Contemporary control models are often based on simulation techniques or techniques from machine learning, e.g., by means of neural networks, and can be specifically trained or designed to optimize the control in respect of predetermined criteria on the basis of training data or other data of the technical system.

As a rule, creating and implementing a control model that is optimized for a technical system requires specific knowledge and a significant development outlay. Therefore such control models are often designed by correspondingly specialized vendors. However, as a rule, the vendor requires data of the technical system for the purposes of developing or training such a control model. Data of the technical system should likewise be supplied to the control model when the designed control model is used to control the technical system at a later stage. However, it is often in the interest of a user or operator of the technical system that critical data of the technical system is not provided to external parties. Conversely, a corresponding interest of the control model vendor is that implementation details of their control model are not provided to external parties.

Nevertheless, as a rule, the control model and the data of the technical system must, as it were, come together at a point to design or carry out the control model. Consequently, a problem arising is that of being able to ensure details of the internal workings of the control model on the one hand and of critical data of the technical system on the other hand are kept confidential from the respective other party.

One option for maintaining a certain amount of confidentiality consists of the model vendor providing their control model to the user of the technical system only in encrypted form. In order to carry out the encrypted control model at the user, the latter is moreover provided with an interpreter which can at least temporarily decrypt the control model at run time. Provided that, on the one hand, the control model is carried out at the user, their data remain confidential as a rule. Provided that, on the other hand, the control model is encrypted, the user is not able to directly access the internal workings of the model; however, the user could decompile the interpreter and thus compromise the encryption of the control model. Although such decompiling is connected with significant outlay as a rule, the confidentiality of the inner workings of the model falls with the willingness of the user to invest therein.

An aspect relates to specify a method and an arrangement for controlling a technical system based on a control model, in which confidentiality of the control model and of data of the technical system is better ensured.

SUMMARY

A transformation function for reducing and/or obfuscating operating data of the technical system to form transformed operating data is provided for the purposes of controlling a technical system based on a control model. Here, obfuscation should be understood to mean, in particular, a concealment of data, e.g., by encoding, dicing, hiding and/or rearranging the latter, such that a reconstruction of the original operating data without a priori knowledge is made at least substantially more difficult. The control model is generated by a model generator as a function of first operating data of the technical system. According to embodiments of the invention, second operating data of the technical system are captured in an access domain that is separated from the control model and said second operating data are transformed into transformed second operating data by the transformation function; said transformed second operating data are received by a model execution system. The control model is executed by the model execution system with a supply of the transformed second operating data in an access domain that is separated from the second operating data, with control data being derived from the transformed second operating data. The control data are transmitted for the purposes of controlling the technical system.

Here, in particular, an access domain should be understood to mean a domain within a data network whose data objects can be accessed from within the domain. Accordingly, data access to a data object that is separated from an access domain from said access domain is not possible, or data access is at least made substantially more difficult.

An arrangement, a computer program product (non-transitory computer readable storage medium having instructions, which when executed by a processor, perform actions) and a computer-readable storage medium are provided to carry out the method according to embodiments of the invention. The arrangement for carrying out the method according to embodiments of the invention can be implemented, in particular, by means of data processors such as, e.g., by means of ASICs (application-specific integrated circuits), DSPs (digital signal processors) and/or FPGAs (field-programmable gate arrays).

One advantage of embodiments of the invention should be considered that of rendering access to the control model by an operator of the technical system on the one hand and rendering access to operating data of the technical system by a model vendor on the other hand at least substantially more difficult in a simple manner. Here, there is no need to encrypt the control model.

According to an advantageous embodiment of the invention, the control model can be generated and, in particular, trained on the basis of first operating data that were transformed by the transformation function. This can prevent original operating data of the technical system being made available to a model vendor, for example for training purposes. Since, in many cases, a training success is not substantially impaired by a preceding transformation of training data, the control model, as a rule, can also be effectively trained based on transformed operating data.

Advantageously, the control model can comprise a neural network, a data-driven regressor, a support vector machine and/or a decision tree. A multiplicity of efficient training and learning methods are available for the aforementioned implementation variants of the control model.

Advantageously, the model generator and/or the model execution system can be operated by a model vendor in a manner separated from the technical system and, in particular, in an access domain that is separated from the technical system.

According to an advantageous embodiment of the invention, the transformation function can be provided by the model vendor and can carry out information reduction. This is advantageous to the extent that the transformation function and the control model can be matched particularly well to one another by the model vendor. The information reduction in this case can make it substantially more difficult for the model vendor to deduce the original operating data of the technical system.

According to a further advantageous embodiment of the invention, the transformation function can be provided by an operator of the technical system and can carry out information obfuscation and/or information reduction. This is advantageous to the extent that the implementation of the transformation function can be taken away from the model vendor. This can better ensure the confidentiality of the operating data from the model vendor.

According to a further advantageous embodiment of the invention, an initial model can be trained based on the first operating data and said initial model can be split into a first partial function and a second partial function. Then, the first partial function can be provided as transformation function and the second partial function can be provided as control model. This allows a trained transformation function and a trained control model to be provided in particularly simple fashion. The partial functions which, as it were, were trained together can be matched particularly well to one another in the process. In one implementation of the initial model as a neural network with at least one hidden layer, this neural network can be split in a hidden layer into two partial neural networks, which then respectively implement the first and the second partial function. The first partial function may comprise an original input layer as an input layer and the hidden layer as an output layer. The second partial function may comprise the hidden layer as an input layer and the original output layer as an output layer.

According to a particularly advantageous embodiment of the invention, the transformation function can comprise a neural autoencoder. A neural autoencoder allows an efficient and, as a rule, non-user-interpretable coding and/or reduction of the operating data while largely maintaining essential data content.

Moreover, the transformation function can comprise multiplication by a random matrix. Here, the random matrix can be populated by random values. An invertible random matrix can be provided for the purposes of obfuscating the operating data. For the purposes of reducing the operating data, provision can be made of a non-invertible random matrix, in particular a non-square random matrix.

Moreover, the control model can be trained based on data that are independent of the technical system, e.g., on the basis of time data, date specifications, weather data and/or other environmental data. In this way, it is also possible to take account of external influencing data, which influence a behavior of the technical system, when optimizing the control.

BRIEF DESCRIPTION

Some of the embodiments will be described in detail, with reference to the following figures, wherein like designations denote like members, wherein.

DETAILED DESCRIPTION

Figure 1A:
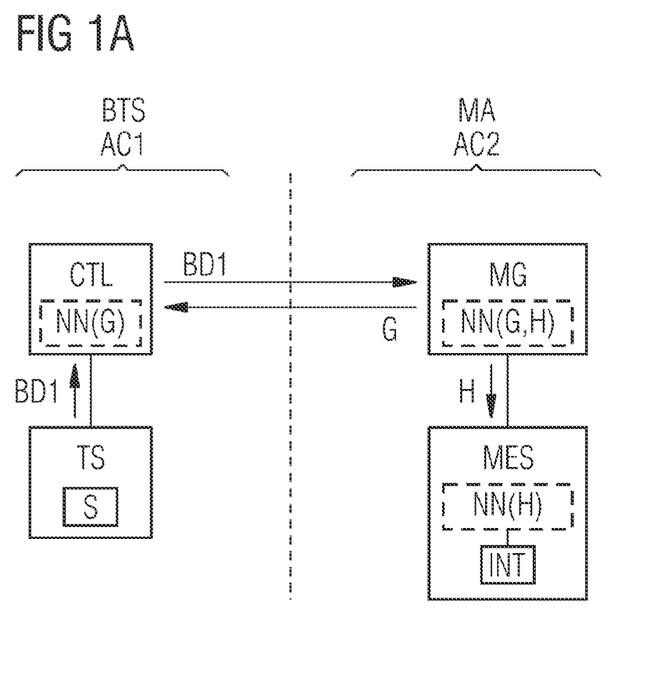
FIG. 1A elucidates training of a control model according to a first exemplary embodiment.
Figure 1B:
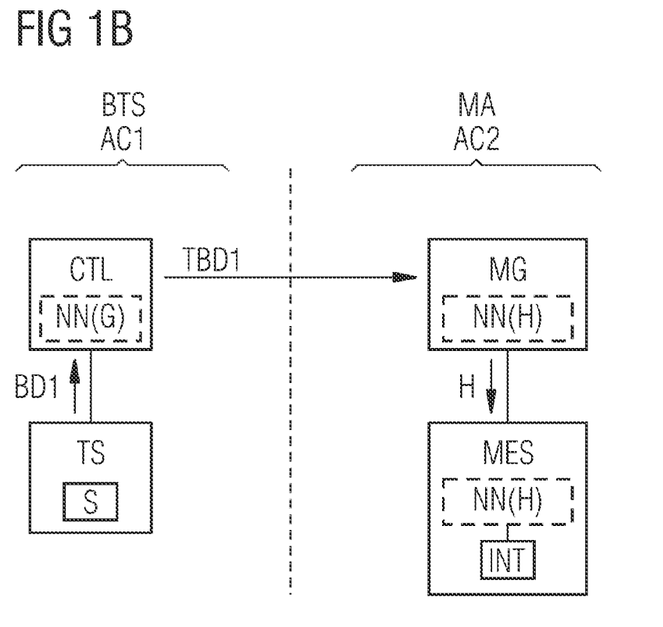
FIG. 1B elucidates training of a control model according to a second exemplary embodiment.

FIGS. 1A and 1B elucidate a control model being generated or trained according to various exemplary embodiments. In FIGS. 1A and 1B, equivalent entities are denoted by the same reference signs.

FIGS. 1A and 1B each show a technical system TS, e.g., a power plant, a turbine, a production line, a motor vehicle or a medical or technical imaging or analysis system, in a schematic representation. A controller CTL is coupled to the technical system TS for the purposes of controlling the technical system TS. The controller CTL can be implemented as part of the technical system TS or can be implemented wholly or partly external to the technical system TS. Furthermore, FIGS. 1A and 1B show a model generator MG for generating and training a control model, and a model execution system MES with an interpreter INT for carrying out the control model, said model execution system being coupled to the model generator MG.

The technical system TS comprises sensors S for capturing operating data of the technical system TS. By way of example, such operating data can be physical, control-related and/or construction-dependent operating variables, properties, predetermined values, state data, system data, control data, sensor data, image data, such as, e.g., x-ray images, measured values, ambient data, or other data arising during the operation of the technical system TS. The operating data of the technical system TS are represented by suitable data structures, in particular by higher-dimensional vectors.

An operator BTS of the technical system TS operates, uses and/or controls the technical system TS and the controller CTL. By contrast, the model generator MG and the model execution system MES are operated by a model vendor MA, who produces a control model for controlling a technical system TS.

The operator BTS of the technical system TS has data access to a first access domain AC1, which is separated from a second access domain AC2 of the model vendor MA. This means that the operator BTS has no data access to the second access domain AC2. Accordingly, the model vendor MA has data access to the second access domain AC2 but no data access to the first access domain AC1. In FIGS. 1A and 1B, the first access domain AC1 and the second access domain AC2 are separated by a dashed line.

The technical system TS and the controller CTL are situated in the first access domain AC1 and accordingly have no data access to the second access domain AC2. The model generator MG and the model execution system MES are situated in the second access domain AC2 and accordingly have no data access to the first access domain AC1.

In particular, the model generator MG serves to train a control model for the technical system TS. Here, training should be understood to mean, in general, a mapping of input parameters of a model, e.g., of a neural network, on one or more target variables. This mapping is optimized during a training phase of the model according to predeterminable or learned criteria, or according to criteria to be learned. In particular, a performance, a resource consumption, a yield and/or a wear of the technical system and/or a production quality, a prediction quality, a classification quality, an analysis quality and/or a simulation quality can be used as criteria. Such training should be understood to mean, in particular, training of a neural network, a data-driven regression, parameter fitting for an analytical model or any other model optimization method. In the case of a neural network, training optimizes, e.g., a network structure of neurons, thresholds of neurons and/or weightings of edges between neurons in respect of an optimization criterion. Coefficients of an employed regressor model can be optimized when training a regressor.

As an alternative or in addition thereto, the model generator MG and/or the model execution system MES can be implemented at least partly outside of the second access domain AC2, e.g., in a cloud, provided there is no data access to the first access domain AC1.

The controller CTL, the model generator MG and the model execution system MES each comprise one or more processors for carrying out all method steps of the controller CTL, the model generator MG and the model execution system MES, respectively, and each comprise one or more memories for storing all data to be processed by the controller CTL, the model generator MG and the model execution system MES, respectively.

In the exemplary embodiments elucidated by FIGS. 1A and 1B, first operating data BD1 of the technical system TS are captured, e.g., by means of the sensors S, and transmitted from the technical system TS to the controller CTL. The first operating data BD1 are used as training data for generating and, in particular, training the control model.

Specifically, FIG. 1A elucidates a generation or training of a control model H in the case where the operator BTS is prepared to provide the model vendor MA with operating data of the technical system TS, the training data BD1 in this case, for the purposes of training the control model H. In this case, the first operating data BD1 are transmitted from the controller CTL to the model generator MG, i.e., from the first access domain AC1 into the second access domain AC2. Based on the transmitted first operating data BD1, the model generator MG generates and trains a transformation function G and the control model H in the second access domain AC2, i.e., outside of the first access domain AC1.

The transformation function G serves to obfuscate and/or reduce operating data of the technical system TS to form transformed operating data. The intention is that the operating data are transformed by the transformation function G in such a way that access to, or reconstruction of, the original operating data is made substantially more difficult. In particular, the transformed operating data should not be user-interpretable. As a result of the obfuscation, i.e., conceal-ment, input data, i.e., the first operating data BD1 in this case, are converted, in particular encoded, hidden, diced and/or rearranged, in such a way that a reconstruction of the input data becomes substantially more difficult without a priori knowledge. Although information content of the input data may be maintained in this case, it is only maintained in a form that is not readily interpretable or reconstructable. As an alternative or in addition thereto, information that is less relevant to the controller of the technical system TS should be removed from the first operating data BD1 by the reduction of the operating data BD1 and, where possible, only controller-relevant information should be maintained. As a result of such an information reduction, an information content of the first operating data BD1, and hence, in particular, a dimension of the representing operating data vectors, can be reduced without substantial loss of controller-relevant information content.

To the extent that the transformation function G is generated in the second access domain AC2 in the exemplary embodiment elucidated by FIG. 1A, the transformation function G is known to the model vendor and should, for the purposes of keeping the first operating data BD1 to be transformed confidential from the model vendor MA, in particular carry out an information reduction such that the model vendor MA cannot readily reconstruct the original first operating data BD1.

The trained transformation function G is transmitted from the model generator MG to the controller CTL, i.e., from the second access domain AC2 into the first access domain AC1. In the controller CTL, the transformation function G is implemented by a trained neural network NN(G).

The trainable or trained control model H serves to simulate or analyze a physical, control-theory-related, stochastic and/or other causal relationship of the technical system TS or a part thereof for the purposes of predicting, classifying operating data and/or for controlling the technical system TS. Hence, the control model H can be used, e.g., for controlling turbines, as a soft sensor, for classifying tumors based on x-ray images or for predicting weather. The control model H models the technical system TS or a part thereof and/or a technical or biological structure, depending on which the technical system TS is controlled or influenced. The control model H can be considered to be a function or routine which is fed operating data of the technical system TS that are transformed by the transformation function G as input data and which outputs the control data as output data. Here, in particular, the control data can be a result of a simulation, prediction, analysis and/or classification. The control model H should be trained in such a way that control data that are optimized from the input data in respect of predetermined criteria can be derived by the control model H. A multiplicity of standard training methods is available for training purposes. By way of example, the predetermined criteria can be represented here by a suitable cost function, for the minimization of which a known learning method is implemented, such as, e.g., supervised, unsupervised and/or reinforcement learning. The control model H is encoded by a data structure which is decodable by the interpreter INT and which is implementable in an application-specific manner. In particular, the control model H can comprise a neural network, a data-driven regressor, a support vector machine, a decision tree and/or another analytical model or a combination thereof.

Since a training success, in particular a training success of a neural network, is not substantially impaired by a preceding transformation of the input data, in this case the first operating data BD1, into a non-user-interpretable form in many cases, the control model H, as a rule, can also be trained on the basis of transformed operating data for deriving well optimized control data.

The transformation function G and the control model H are implemented by an artificial neural network NN(G, H) in the model generator MG. The trained control model H is transmitted from the model generator MG to the model execution system MES. There, the control model H is implemented by a neural network NN(H). Here, the control model H remains outside the first access domain AC1, i.e., the operator BTS of the technical system TS has no access to the control model H.

FIG. 1B specifically elucidates a generation or training of a control model H for the case where the operator BTS of the technical system TS is not prepared to make operating data of the technical system TS available to the model vendor MA.

In this case, the transformation function G is generated and trained by the controller CTL on the basis of the first operating data BD1 in the first access domain AC1. The transformation function G is implemented by a neural network NN(G) in the controller CTL. By way of the trained neural network NN(G), the first operating data BD1 are transformed into transformed first operating data TBD1 within the first access domain AC1, i.e., outside of the second access domain AC2.

To the extent that the transformation function G in the exemplary embodiment described by FIG. 1B is generated in the first access domain AC1, the transformation function G is generally not known to the model vendor MA. So that the transformation by the transformation function G removes as little data relevant to the optimized control as possible from the first operating data BD1, a transformation function G that substantially maintains information and/or that is invertible is generated, said transformation function carrying out an efficient obfuscation and, optionally, a dimensional reduction of the first operating data BD1. As an alternative or in addition thereto, the transformation function G may comprise application-specific pre-processing of the first operating data BD1 and/or a neural autoencoder, which optionally carries out a dimensional reduction of the first operating data BD1. Moreover, different basis functions can be calculated and used for training the transformation function G or the control model H. Furthermore, additional data can be added to the first operating data BD1 in order to ensure or improve a training success for the transformation function G and/or for the control model H.

The transformed first operating data TBD1 is transmitted from the controller CTL to the model generator MG. Thereupon, the model generator MG generates and trains the control model H based on the transformed first operating data TBD1. Here, the control model H is implemented by a neural network NN(H). Otherwise, the transformation function G and the control model H can be used, as described in conjunction with FIG. 1A.

The trained control model H is transmitted from the model generator MG to the model execution system MES. The control model H is implemented by a neural network NN(H), in the model execution system MES. Here, the control model H remains outside of the first access domain AC1, and so the operator BTS of the technical system TS gains no access to the control model H.

In both exemplary embodiments described in FIGS. 1A and 1B, the neural network NN(G) can be implemented by means of a neural autoencoder. An autoencoder comprises an artificial neural network for learning efficient data codes in particular for efficient data compression and/or for extracting essential or characteristic features of input data.

Figure 2:
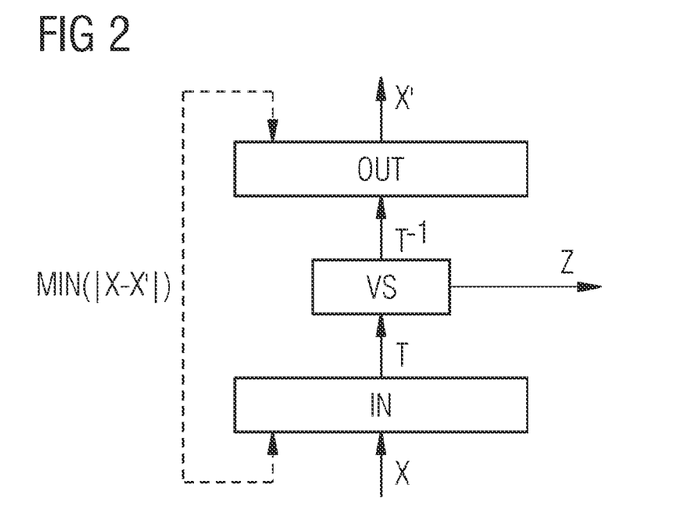
FIG. 2 elucidates a neural autoencoder as a transformation function.

Such an autoencoder is schematically illustrated in FIG. 2. In the present exemplary embodiments, the neural autoencoder comprises a neural input layer IN, at least one hidden layer VS, which has significantly fewer neurons than the input layer IN, and an output layer OUT, the neurons of which do not correspond to the neurons of the input layer IN. Input data X are fed to the input layer IN, said input data being propagated via the hidden layer VS to the output layer OUT. The latter outputs the propagated data as output data X'. Thereupon, the autoencoder is trained so that the output data X' deviates as little as possible from the input data X, for example by virtue of an absolute value of a difference X-X' being minimized.

The input data X are subject to a transformation T during the propagation from the input layer IN to the hidden layer VS. If a small deviation |X-X'| can be achieved by the training, this means that the transformation T during the propagation of the data from the hidden layer VS to the output layer OUT is at least approximately undone, i.e., the data are subjected approximately to the transformation during this transition. Furthermore, a small deviation |X-X'| means that the input data can already be represented well by the fewer number of neurons of the hidden layer VS or can be reconstructed therefrom by means of the trained layers VS and OUT.

The data propagated by the hidden layer VS thus represent an efficient encoding of the input data X and can be output as transformed input data Z. On the other hand, a reconstruction of the original input data X from the transformed output data Z is only possible with the great difficulties without knowledge of the trained hidden layer VS and the trained output layer OUT. Therefore, an autoencoder is a particularly advantageous implementation of the transformation function G within the meaning of embodiments of the invention.

In the present exemplary embodiments, a neural autoencoder is trained as a transformation function G with the first operating data BD1 as input data X. The trained autoencoder, i.e., the trained transformation function G, outputs the transformed first operating data TBD1 as transformed data Z.

As an alternative or in addition thereto, the transformation function G may comprise multiplication by an invertible or non-invertible random matrix.

Figure 3:
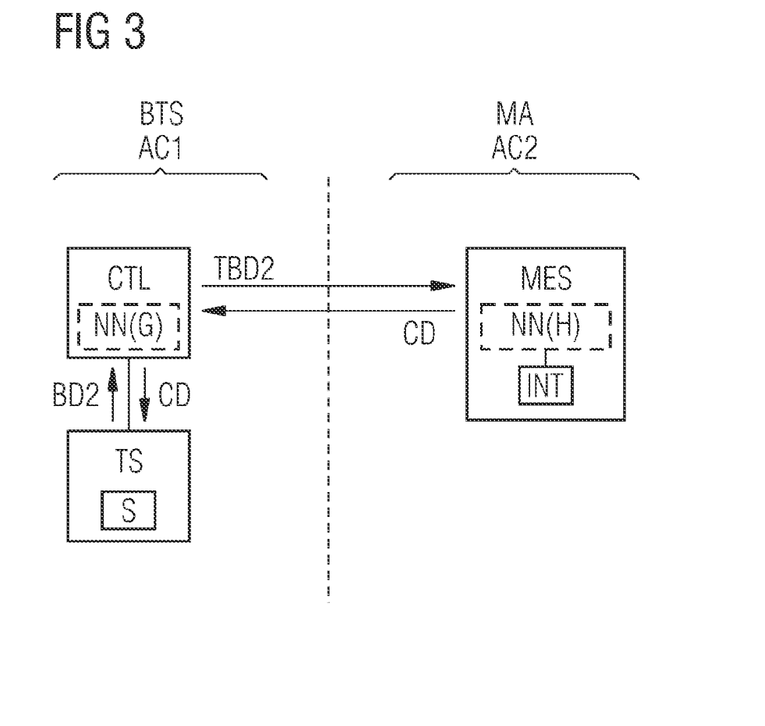
FIG. 3 elucidates an implementation of a trained control model for controlling a technical system.

FIG. 3 elucidates an implementation of a trained control model, of the trained control model H in this case, for controlling the technical model TS. Here, the control model H may have been generated and trained according to one of the aforementioned exemplary embodiments. Otherwise, the same entities in FIGS. 1A, 1B and 3 are denoted by the same reference signs.

For the purposes of controlling the technical system TS, second operating data BD2 of the technical system TS are captured by the controller CTL within the first access domain AC1 and said second operating data are transformed by the trained neural network NN(G) to form transformed second operating data TBD2. In particular, this is implemented outside of the second access domain AC2, and so the model vendor MA has no access to the second operating data BT2 or to the transformation function G.

The transformed second operating data TBD2 are transmitted from the controller CTL to the model execution system MES. The trained neural network NN(H) is implemented by the model execution system MES in the second access domain AC2 by means of the interpreter INT. Here, the transformed second operating data TBD2, from which control data CD are derived by the trained control model H, are fed to the trained control model H. In particular, this is implemented outside of the first access domain AC1, and so the operator of the technical system TS has no data access to the control model H. The derived control data CD serve to control the technical system TS. In particular, the control data CD may be simulation data, prediction data, analysis data, state data, classification data, monitoring data and/or other data contributing to the control of the technical system TS. The control data CD are transmitted from the model execution system MES to the controller CTL. Then, the controller CTL controls the technical system TS by means of the control data CD.

As a result of separating the transformation of the second operating data BD2 from the execution of the control model H, it is possible, on the one hand, for the model vendor MA to keep their control model H confidential from the operator BTS and, on the other hand, for the operator BTS to keep their operating data BD2 confidential from the model vendor MA. Encrypting the control model H is not necessary in this case.

Figure 4:
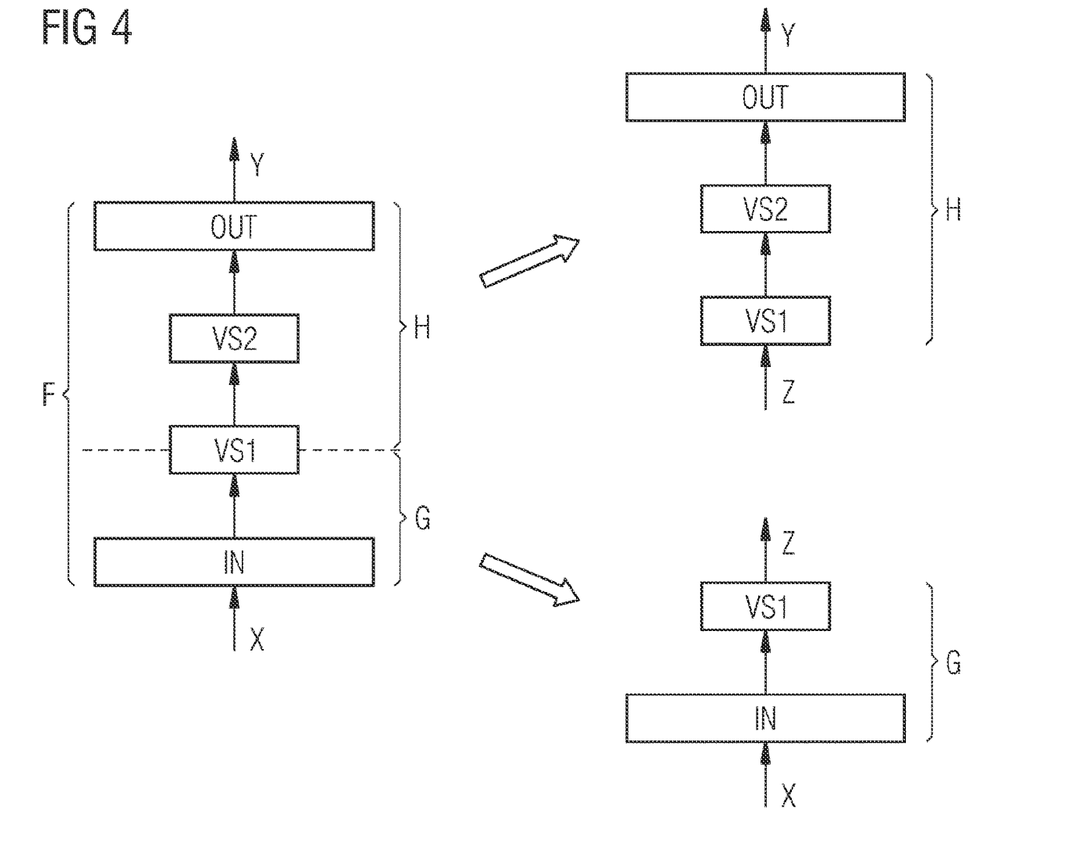
FIG. 4 elucidates training of an initial model and the split thereof into a transformation function and a control model.

FIG. 4 elucidates a particularly advantageous generation of a transformation function G and a control model H from an initial model F. Here, the initial model F is trained as a whole and the trained initial model F is split into the transformation function G and the control model H. Training and splitting is carried out by the model vendor MA, i.e., within the second access domain AC2 and outside of the first access domain AC1. In particular, the split can be set by the model vendor MA in this case. The split is undertaken in such a way that confidential implementation details of the initial model F are encoded as completely as possible in the control model H and not in the transformation function G. The transformation function G and the control model H which are generated in this way can then be used as described above.

The initial model F is a neural network with an input layer IN, a plurality of hidden layers VS1, VS2 and an output layer OUT. At least one of the hidden layers, in this case VS1, comprises fewer neurons than the input layer IN. The initial model F is initially trained as a uniform neural network on the basis of input data X, the first operating data BD1 in this case, such that the output data Y, the control data CD in this case, which are derived from the input data X are optimized in respect of predetermined criteria. The aforementioned optimization criteria can be used as criteria.

Following its training, the initial model F is split into two partial neural networks at a hidden layer, VS1 in this case. The partial network with the layer IN as input layer and the layer VS1 as new output layer, illustrated at the bottom in FIG. 4, represents a first partial function in this case. The transformed data Z output in the lower partial network by the hidden layer VS1 are obfuscated, and so the input data X cannot readily be reconstructed therefrom. Moreover, the transformed data are also reduced in terms of their dimensions since the hidden layer VS1 has fewer neurons than the input layer IN. Consequently, the first partial function can be advantageously provided and used as a trained transformation function G for transforming the input data X, i.e., the second operating data BD2 in this case, into transformed data Z, i.e., into the transformed second operating data TBD2 in this case, as described above. Hence, $Z=G(X)$ and $TBD2=G(BD2)$ apply.

The partial network illustrated at the top in FIG. 4 with the hidden layer VS1 as new input layer and the original output layer OUT as output layer represents a second partial function. The upper partial network is trained to convert data Z that were input at the hidden layer VS1 and transformed by the transformation function G into the output data Y, i.e., into the optimized control data CD in this case. Consequently, the second partial function can advantageously be provided and used as trained control model H for deriving the control data CD from the transformed second operating data TBD2, as described above. Hence, $Y=H(Z)$ and $CD=H(TBD2)$ apply.

As a result of the model generation elucidated in FIG. 4, it is possible to provide a trained transformation function G and a trained control model H in particularly simple fashion. The partial functions G and H, which were trained together in a certain sense, are consistent in a natural manner and matched particularly well to one another in this case.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a technical system based on a control model, said method comprising:
generating, by a model generator residing in a second access domain, the control model as a function of first operating data received from the technical system residing in a first access domain that is separated from the second access domain, said control model configured to output control data upon being executed using second operating data that was transformed by being reduced and/or obfuscated;
receiving, by a model execution system residing in the second access domain from a controller residing in the first access domain, the transformed second operating data;
executing, by the model execution system using the transformed second operating data, the control model, said executing the control model comprising outputting the control data; and
transmitting, by the model execution system to the controller, the control data, wherein the control data is configured to control the technical system by the controller,
wherein the model generator, the model execution system and the controller each comprise one or more processors for carrying out all method steps performed by the model generator, the model execution system, and the controller, respectively.

2. The method as claimed in claim 1, wherein the control model is generated by the model generator based on the first operating data having been transformed by a transformation function that reduces and/or obfuscates the first operating data after the transformation was generated and trained by the model generator based on the first operating data.

3. The method as claimed in claim 2, wherein the model generator and/or the model execution system are operated by a model vendor in the second access domain, and wherein the transformation function is provided to the model generator by the model vendor.

4. The method as claimed in claim 2, wherein the transformation function comprises a neural autoencoder.

5. The method as claimed in claim 2, wherein the transformation function comprises multiplication by a random matrix.

6. The method as claimed in claim 1, wherein the control model comprises at least one of a neural network, a data-driven regressor, a support vector machine, and a decision tree.

7. The method as claimed in claim 1, wherein an operator (BTS) in the first access domain uses and/or controls the technical system and the controller, and wherein a transformation function that reduces and/or obfuscates the first operating data is provided to the controller by the operator (BTS).

8. The method as claimed in claim 1, said method further comprising:
training, in the second access domain using the first operating data, an initial model; and
splitting, in the second access domain, the initial model into a first partial function and a second partial function, wherein the first partial function is a transformation function configured to reduce and/or obfuscate the first operating data and wherein the second partial function is the control model.

9. The method as claimed in claim 1, wherein the control model is trained on the basis of data that are independent of the technical system.

10. The method as claimed in claim 1, wherein the control model is generated by the model generator based on the first operating data having been previously transformed in the first access domain by a transformation function that reduces and/or obfuscates the first operating data after the transformation was generated and trained by the controller based on the first operating data.

11. A computer system comprising one or more processors, one or more memories, a computer readable hardware storage device having computer readable program code stored therein, said program code executable by the one or more processors via the one or more memories to implement a method for controlling a technical system based on a control model, said method comprising:
generating, by a model generator residing in a second access domain, the control model as a function of first operating data received from the technical system residing in a first access domain that is separated from the second access domain, said control model configured to output control data upon being executed using second operating data that was transformed by being reduced and/or obfuscated;
receiving, by a model execution system residing in the second access domain from a controller residing in the first access domain, the transformed second operating data;
executing, by the model execution system using the transformed second operating data, the control model, said executing the control model comprising outputting the control data; and
transmitting, by the model execution system to the controller, the control data, wherein the control data is configured to control the technical system by the controller,
wherein the model generator, the model execution system and the controller each comprise one or more processors for carrying out all method steps performed by the model generator, the model execution system, and the controller, respectively.

12. The computer system as claimed in claim 11, wherein the control model is generated by the model generator based on the first operating data having been transformed by a transformation function that reduces and/or obfuscates the first operating data after the transformation was generated and trained by the model generator based on the first operating data.

13. The computer system as claimed in claim 11, wherein the control model is generated by the model generator based on the first operating data having been previously transformed in the first access domain by a transformation function that reduces and/or obfuscates the first operating data after the transformation was generated and trained by the controller based on the first operating data.

14. A computer program product, comprising a computer readable hardware storage device having computer readable program code stored therein, said program code executable by one or more processors of a computer system to implement a method for controlling a technical system based on a control model, said method comprising:
generating, by a model generator residing in a second access domain, the control model as a function of first operating data received from the technical system residing in a first access domain that is separated from the second access domain, said control model configured to output control data upon being executed using second operating data that was transformed by being reduced and/or obfuscated;
receiving, by a model execution system residing in the second access domain from a controller residing in the first access domain, the transformed second operating data;
executing, by the model execution system using the transformed second operating data, the control model, said executing the control model comprising outputting the control data; and
transmitting, by the model execution system to the controller, the control data, wherein the control data is configured to control the technical system by the controller,
wherein the model generator, the model execution system and the controller each comprise one or more processors for carrying out all method steps performed by the model generator, the model execution system, and the controller, respectively.

15. The computer program product as claimed in claim 14, wherein the control model is generated by the model generator based on the first operating data having been transformed by a transformation function that reduces and/or obfuscates the first operating data after the transformation was generated and trained by the model generator based on the first operating data.

16. The computer program product as claimed in claim 14, wherein the control model is generated by the model generator based on the first operating data having been previously transformed in the first access domain by a transformation function that reduces and/or obfuscates the first operating data after the transformation was generated and trained by the controller based on the first operating data.

* * * * *